US012248755B2

(12) United States Patent
Lange et al.

(10) Patent No.: US 12,248,755 B2
(45) Date of Patent: Mar. 11, 2025

(54) BUILDING BOTS FROM RAW LOGS AND COMPUTING COVERAGE OF BUSINESS LOGIC GRAPH

(71) Applicant: Google LLC, Mountain View, CA (US)

(72) Inventors: Joseph Lange, Zürich (CH); Henry Scott Dlhopolsky, Zürich (CH); Vladimir Vuskovic, Zollikerberg (CH)

(73) Assignee: Google LLC, Mountain View, CA (US)

( * ) Notice: Subject to any disclaimer, the term of this patent is extended or adjusted under 35 U.S.C. 154(b) by 277 days.

(21) Appl. No.: 18/064,230

(22) Filed: Dec. 9, 2022

(65) Prior Publication Data

US 2024/0193372 A1 Jun. 13, 2024

(51) Int. Cl.
G06N 20/00 (2019.01)
G06F 40/20 (2020.01)
G06F 40/30 (2020.01)
G06F 40/35 (2020.01)
G06N 3/08 (2023.01)
G06Q 30/02 (2023.01)

(52) U.S. Cl.
CPC ............. *G06F 40/35* (2020.01); *G06F 40/20* (2020.01); *G06F 40/30* (2020.01); *G06N 3/08* (2013.01); *G06N 20/00* (2019.01); *G06Q 30/0281* (2013.01)

(58) Field of Classification Search
CPC .......... G06N 20/00; G06N 3/08; G06F 40/35; G06F 40/30; G06F 40/20
See application file for complete search history.

(56) References Cited

U.S. PATENT DOCUMENTS

| 11,418,652 | B1* | 8/2022 | Tron ..................... G06N 20/00 |
| 11,475,067 | B2* | 10/2022 | Nogueira Dos Santos ................ G06F 18/2148 |
| 2018/0367480 | A1* | 12/2018 | Housman ............ G06F 40/247 |
| 2019/0182382 | A1* | 6/2019 | Mazza .................. H04M 3/527 |
| 2019/0259036 | A1* | 8/2019 | Chakraborty .......... G06N 3/044 |
| 2020/0082214 | A1* | 3/2020 | Salammagari ......... G06N 3/006 |
| 2022/0309096 | A1* | 9/2022 | Patil ..................... G06F 16/685 |
| 2023/0197105 | A1* | 6/2023 | Tanuku .................. G06F 40/20 704/235 |
| 2024/0193372 | A1* | 6/2024 | Lange .................... G06N 20/00 |

* cited by examiner

Primary Examiner — Samuel G Neway
(74) Attorney, Agent, or Firm — Honigman LLP; Brett A. Krueger

(57) ABSTRACT

A method for dynamically generating training data for a model includes receiving a transcript corresponding to a conversation between a customer and an agent, the transcript comprising a customer input and an agent input. The method includes receiving a logic model including a plurality of responses, each response of the plurality of responses representing a potential reply to the customer input. The method further includes selecting, based on the agent input, a response from the plurality of responses of the logic model. The method includes determining that a similarity score between the selected response and the agent input satisfies a similarity threshold, and, based on determining that the similarity score between the selected response and the agent input satisfies the similarity threshold, training a machine learning model using the customer input and the selected response.

20 Claims, 7 Drawing Sheets

BUILDING BOTS FROM RAW LOGS AND COMPUTING COVERAGE OF BUSINESS LOGIC GRAPH

TECHNICAL FIELD

This disclosure relates to new methodologies to build bots from raw logs and compute coverage of business logic graphs.

BACKGROUND

Natural-language understanding (NLU) is a subtopic of natural-language processing that focuses on comprehension of received language. Artificial interpretation of language can be useful in a variety of applications. For example, NLU can be used by a "chatbot" to simulate human-like conversation with a user through text messages. In particular, NLU can be used to interpret a language input of a user to inform an appropriate response to the input. In some examples, the NLU generates an output defining an intent or context of the language input. The output is then provided to a logic model which selects the response to the language input based on the output of the NLU.

SUMMARY

One aspect of the disclosure provides a computer-implemented method for dynamically generating training data for a model. The computer-implemented method, when executed by data processing hardware, causes the data processing hardware to perform operations that include receiving a transcript corresponding to a conversation between a customer and an agent. The transcript includes a customer input and an agent input. The operations further include receiving a logic model including a plurality of responses, each response of the plurality of responses representing a potential reply to the customer input. The operations include selecting, based on the agent input, a response from the plurality of responses of the logic model. Further, the operations include determining that a similarity score between the selected response and the agent input satisfies a similarity threshold. The operations include, based on determining that the similarity score between the selected response and the agent input satisfies the similarity threshold, training a machine learning model using the customer input and the selected response.

Implementations of the disclosure may include one or more of the following optional features. In some implementations, the machine learning model is a natural language understanding (NLU) model. Further, determining that the similarity score between the selected response and the agent input satisfies the similarity threshold may include using an embedding to compare the selected response to the agent input. In some implementations, the logic model includes a logic tree.

In some implementations, the transcript is a first transcript. In these implementations, the operations further include receiving a second transcript corresponding to a second conversation between the customer and the agent, the second transcript including a second customer input and a second agent input. In these implementations, the operations include selecting, based on the second agent input, a second response from the plurality of responses of the logic model. Further, in these implementations, the operations include determining that a second similarity score between the selected second response and the second agent input fails to satisfy the similarity threshold. Based on determining that the similarity score between the selected second response and the second agent input fails to satisfy the similarity threshold, the operations include discarding the second transcript.

Selecting, based on the agent input, the response from the plurality of responses of the logic model may include iterating through the plurality of responses to find the response that most closely matches the agent input. In some implementations, the customer input is a first customer input, the agent input is a first agent input, and the transcript include a second customer input and a second agent input. In these implementations, the operations further include selecting, based on the second agent input, a second response from the plurality of responses of the logic model. In these implementations, the operations may further include determining that a second similarity score between the selected second response and the second agent input fails to satisfy the similarity threshold, and, based on determining that the second similarity score between the selected second response and the second agent input fails to satisfy the similarity threshold, adding a new response to the plurality of responses based on the second agent input. In these implementations, the logic model may include a metric indicating a coverage of the model. In these implementations, the operations may further include, based on determining that the second similarity score between the selected second response and the second agent input does not satisfy the similarity threshold, reducing the metric. The transcript may include a pre-screened transcript.

Another aspect of the disclosure provides a system for dynamically generating training data for a model. The system includes data processing hardware and memory hardware in communication with the data processing hardware. The memory hardware stores instructions that when executed on the data processing hardware cause the data processing hardware to perform operations. The operations include receiving a transcript corresponding to a conversation between a customer and an agent, the transcript including a customer input and an agent input. The operations further include receiving a logic model including a plurality of responses, each response of the plurality of responses representing a potential reply to the customer input. The operations include selecting, based on the agent input, a response from the plurality of responses of the logic model. Further, the operations include determining that a similarity score between the selected response and the agent input satisfies a similarity threshold. The operations include based on determining that the similarity score between the selected response and the agent input satisfies the similarity threshold, training a machine learning model using the customer input and the selected response.

This aspect may include one or more of the following optional features. In some implementations, the machine learning model is a natural language understanding (NLU) model. Further, determining that the similarity score between the selected response and the agent input satisfies the similarity threshold may include using an embedding to compare the selected response to the agent input. In some implementations, the logic model includes a logic tree.

In some implementations, the transcript is a first transcript. In these implementations, the operations further include receiving a second transcript corresponding to a second conversation between the customer and the agent, the second transcript including a second customer input and a second agent input. In these implementations, the operations include selecting, based on the second agent input, a second response from the plurality of responses of the logic model. Further, in these implementations, the operations include determining that a second similarity score between the selected second response and the second agent input fails to satisfy the similarity threshold. Based on determining that the similarity score between the selected second response and the second agent input fails to satisfy the similarity threshold, the operations include discarding the second transcript.

Selecting, based on the agent input, the response from the plurality of responses of the logic model may include iterating through the plurality of responses to find the response that most closely matches the agent input. In some implementations, the customer input is a first customer input, the agent input is a first agent input, and the transcript include a second customer input and a second agent input. In these implementations, the operations further include selecting, based on the second agent input, a second response from the plurality of responses of the logic model. In these implementations, the operations may further include determining that a second similarity score between the selected second response and the second agent input fails to satisfy the similarity threshold, and, based on determining that the second similarity score between the selected second response and the second agent input fails to satisfy the similarity threshold, adding a new response to the plurality of responses based on the second agent input. In these implementations, the logic model may include a metric indicating a coverage of the model. In these implementations, the operations may further include, based on determining that the second similarity score between the selected second response and the second agent input does not satisfy the similarity threshold, reducing the metric. The transcript may include a pre-screened transcript.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Natural-language understanding (NLU) is a growing field of language processing focused on interpreting received language inputs. Recently, neural networks for machine learning have been found to perform well as a base for NLU systems and models. Using machine learning techniques, NLU models may be trained on large sets of training data to produce a robust model for language understanding. Once trained, a NLU model can interpret received language inputs. In some examples, the NLU model outputs an "intent" characterizing the received language input. The intent can be used by the NLU and/or other models to determine an appropriate action in response to the language input.

NLU models have a wide variety of uses, from machine translation and transcription of speech to question answering. Question answering can be seen in common applications, such as a chatbot (or "bot"), which is a text-based interface for automated machine generated responses to customer inputs. In question answering, an NLU model can determine the intent of a language input which can be used to generate a response. In some examples, the NLU can feed the intent to another model, such as a logic model, and other model then determines a response (in this context, a text-based response) based on the intent.

There are a number of challenges in generating an effective question answering bot. For one, NLU models are typically large, as the more extensively the model is trained, the better it performs. However, it can be difficult to acquire large data sets to train NLUs. While language inputs are readily available (in the form of transcripts and audio samples of spoken language) to be used as training data, the language inputs must be labelled. Typically, language inputs are labelled manually, which is a time consuming and labor intensive process. Further, logic models are typically manually generated which causes the chatbot to be inflexible (i.e., it can be difficult/time consuming to implement changes to a logic model). Also, there are currently no effective automated systems for evaluating such logic models.

Implementations herein are directed toward automatically generating training data for NLU models. In particular, a logic model may be used to automatically generate labels for transcripts such that the transcripts can be used to train the NLU model. Additionally or alternatively, implementations herein are directed toward dynamic bot building by automatically populating logic models. For example, when the logic model does not have a satisfactory response to a given language input, a new response can be added to the logic model. Further, implementations herein are directed toward automatically evaluating a logic model by determining how the logic model performs against various inputs.

Figure 1:
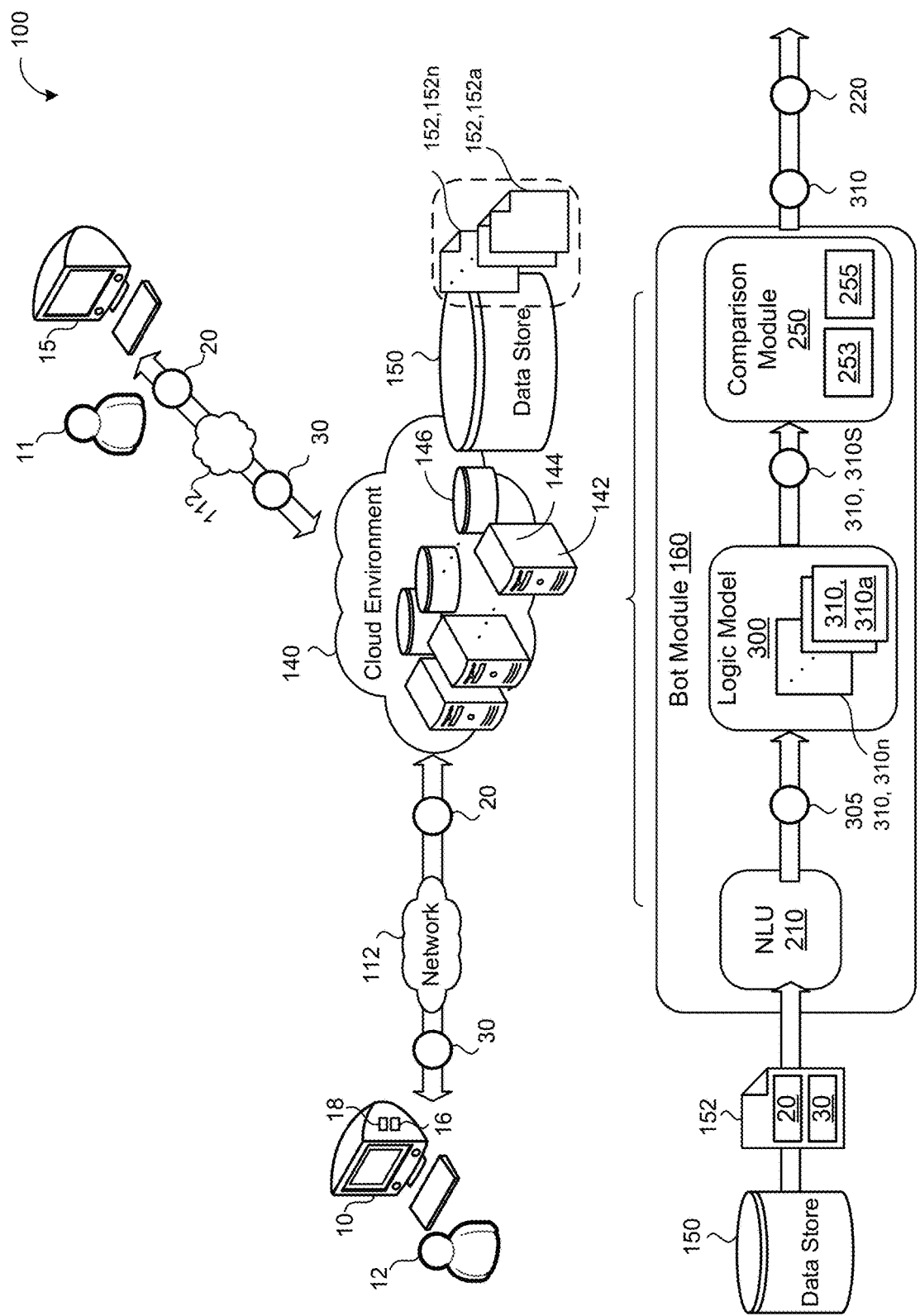
FIG. 1 is a schematic view of an example system for dynamically generating training data for a model.

Referring now to FIG. 1, in some implementations, an example system 100 for dynamically generating training data 220 for a model 210 includes a remote system 140 (e.g., a cloud computing environment 140) in communication with one or more customer devices 10 via a network 112. The remote system 140 may be a single computer, multiple computers, or a distributed system (e.g., a cloud environment) having scalable/elastic resources 142 including computing resources 144 (e.g., data processing hardware) and/or storage resources 146 (e.g., memory hardware). Additionally, an agent device 15 may be communicatively coupled to the remote system 140, via the network 112 (or a different network), such that an agent 11 can communicate with a customer 12. The customer 12 may transmit customer inputs 20 the agent 11 (e.g., "What discounts are available?") and the agent 11 may response with one or more agent inputs 30 (e.g., "No discounts are currently available."). A data store 150 (i.e., a remote storage device) may be overlain on the storage resources 146 to allow scalable use of the storage resources 146 by one or more of the clients (e.g., the customer device 10), the agents 11 (e.g., the agent device 15), and/or the computing resources 144. The data store 150 is configured to store a plurality of transcripts 152, 152a-n. Each transcript includes one or more of the customer inputs 20 and one or more of the agent inputs 30. The data store 150 may store any number of transcripts 152 at any point in time.

The remote system 140 is configured to receive the one or more customer inputs 20 from the customer device 10 associated with the respective customer 12 via, for example, the network 112 and the one or more agent inputs 30 from the agent device 15 associated with the respective agent 11 via, for example, the network 112. The customer device 10 and/or agent device 15 may correspond to any computing device, such as a desktop workstation, a laptop workstation, or a mobile device (i.e., a smart phone). The customer device 10 (and similarly agent device 15, though not illustrated) includes computing resources 18 (e.g., data processing hardware) and/or storage resources 16 (e.g., memory hardware).

The remote system 140 executes a bot module 160 for dynamically generating training data 220. In some implementations, the bot module 160 generates one or more responses 310 in response to the customer inputs 20. Additionally or alternatively, the bot module 160 is configured to dynamically build or generate a chat bot by improving and/or evaluating a logic model 300. The bot module 160 is configured to receive the one or more transcripts 152. Each transcript 152 includes at least one customer input 20 and one agent input 30. The bot module 160 may use the logic model 300 to label the transcripts 152 to be used as training data 220 for an NLU model 210, as described in greater detail below (FIG. 2A).

In other implementations the bot module 160 provides the transcript 152 to the NLU model 210 to generate an intent 305. The bot module may 160 may then provide the generated intent 305 to the logic model 300. The logic model 300 iterates through one or more responses 310, 310a-n to select a response 310, 310S based on the intent 305. Here, each response 310 may be a potential reply to the customer input 20 (i.e., a possible response to the question/comment represented by the customer input 20). The bot module 160 optionally provides the selected response 310S to a comparison module 250. The comparison module 250, in some examples, generates a similarity score 253 for the selected response 310S. In some implementations, the similarity score 253 is based on a comparison between the selected response 310S and the agent input 30 that corresponds to the customer input 20 of the transcript 152. That is, the similarity score 253 represents how similar the selected response 310S (using natural language) to the agent input 30 that represents the "ground truth" response to the customer input 20. The comparison may use embedding techniques to generate the similarity score 253. The comparison module 250, in some implementations, compares the similarity score 253 to a similarity threshold 255. Based on the comparison between the similarity score and to the similarity threshold 255, the bot module 160 performs one or more actions, as described in greater detail below (FIG. 2B).

The system of FIG. 1 is presented for illustrative purposes only and is not intended to be limiting. For example, although only a single example of each component is illustrated, the system 100 may include any number of components 10, 15, 112, 140, 150, and 160. Further, although some components are described as being located in a cloud computing environment 140, in some implementations, some or all of the components may be hosted locally on the customer device 10 and/or agent device 15. Further, in various implementations, some or all of the components 150 and 160, are hosted locally on customer device 10 and/or agent device 15, remotely (such as in the cloud computing environment 140), or some combination thereof.

Figure 2A:
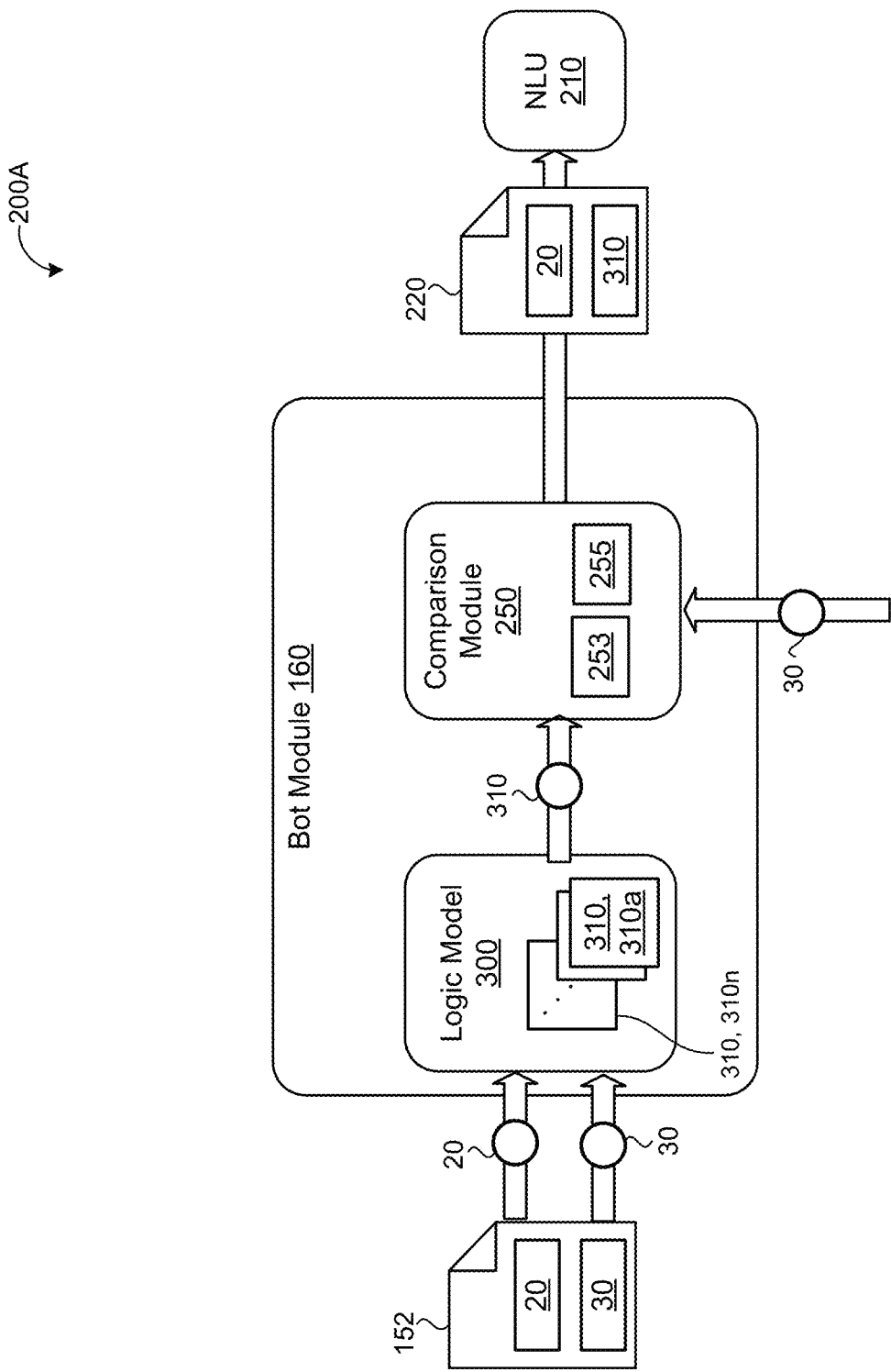
FIG. 2A is a schematic view of an example bot module dynamically generating training data for a model.
Figure 2B:
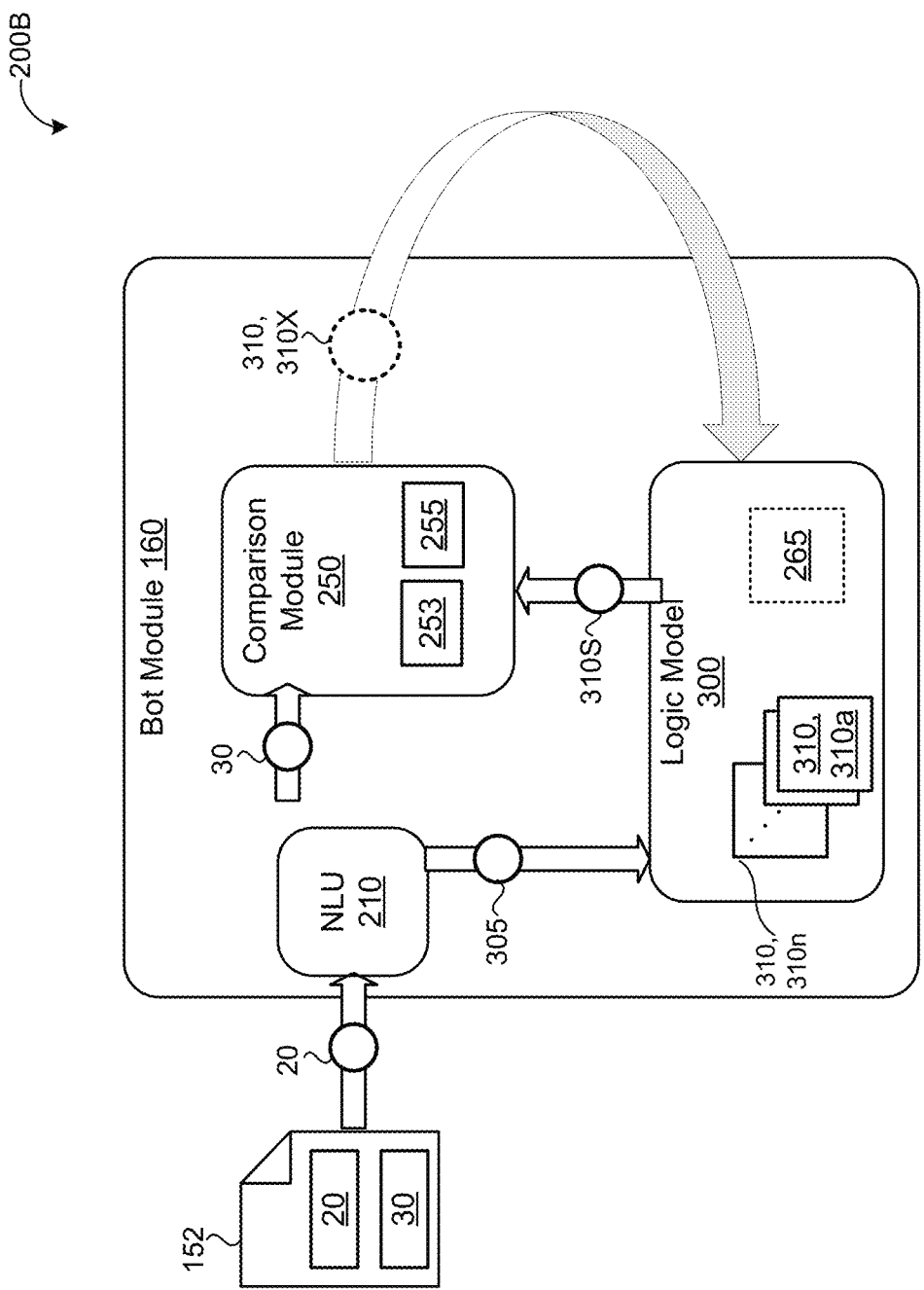
FIG. 2B is a schematic view of an example bot module dynamically building a logic model for a chat bot.

FIG. 2A includes a schematic view 200A of an example bot module 160 dynamically generating training data 220 for a model 210. The training data 220 is based on transcripts 152 which include at least one customer inputs 20 and at least one agent input 30. Here, the bot module 160 feeds the transcript 152 directly to the logic model 300. In some implementations, the bot module 160 parses through the transcript 152 by analyzing one customer input 20/agent input 30 pair at a time. For example, the bot module 160 analyzes a first customer input 20/agent input 30 pair to attempt to generate training data 220 from the first pair. When successful, the bot module 160, in some examples, moves to the next customer input 20/agent input 30 pair. When the bot module 160 determines that a customer input 20/agent input 30 pair cannot be used for training data (i.e., when not successful), the bot module 160 optionally discards the rest of the transcript (e.g., the conversation between the customer 12 and the agent 11 has moved off-topic and/or beyond the scope of the logic model 300).

Figure 3:
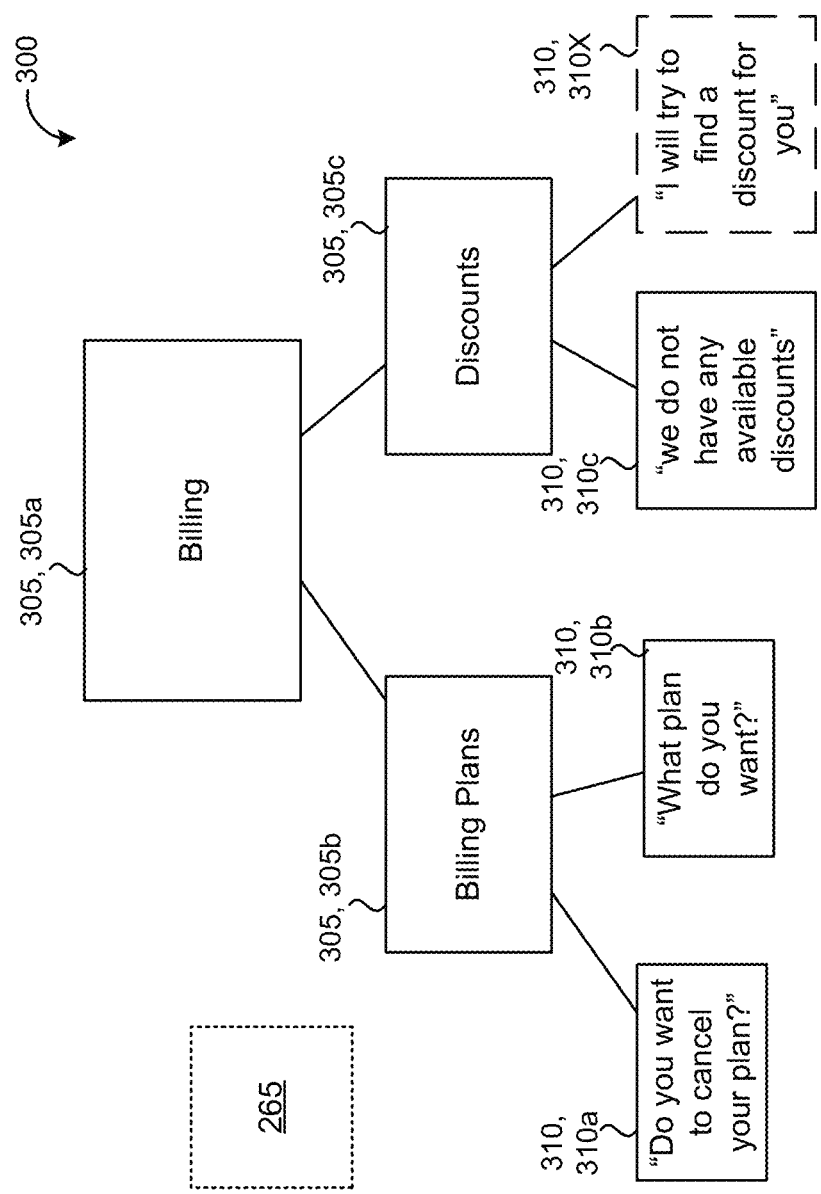
FIG. 3 is a schematic view of an example logic model.

The bot module 160 may generate training data for a customer input 20/agent input 30 pair of a transcript by feeding the pair to the logic model 300. In some implementations, the bot module 160 selects a response 310 from the logic model 300 based on the customer input 20 (i.e., analyze the customer input 20 and try to determine the response 310 that is most appropriate). In other implementations, the bot module 160 selects the response 310 that is most similar to the agent response 30 corresponding to the customer input 20. For example, the bot module 160 iteratively provides each respective response 310 to the comparison module 250 to determine a similarity score 253 for each response 310. In this example, the bot module 160 selects the response 310 with the highest similarity score 253 (i.e., the response 310 that is most similar, based on the similarity score 253, to the agent input 30). Next, the bot module 160 compares the similarity score 253 of the response 310 to a similarity threshold 255. When the similarity score 253 of the response 310 satisfies the similarity threshold 255 (e.g., when the similarity score 253 is equal to or larger than the similarity threshold 255), the bot module 160 generates training data 220 based on the transcript 152. That is, in some examples, when the similarity score 253 of the response 310 satisfies the similarity threshold 255, the bot module 160 determines that the transcript 152 is suitable for training data 220. Put another way, in this scenario, the bot module 160 determines that the transcript 152 includes inputs 20, 30 relevant to training the model 210. The training data 220 may include the customer input 20, the agent input 30 (not illustrated), the response 310, and any combination thereof. In some implementations, the response 310 also corresponds to one or more intents 305, as discussed in greater detail below (FIG. 3).

As an example, a first customer input 20 of a transcript 152 is "I want a new plan." and the corresponding agent input 30 (i.e., the response of the agent 11 to the customer 12) is "What plan do you want?" The bot module 160 searches for the response 310 of the logic model 300 that is closest to the agent input 30 (i.e., most similar to "What plan do you want?"). For example, the most similar response 310 of the logic model is "What kind of plan would you like?" which satisfies the similarity threshold 255. In this example, the bot module 160, in response, stores the customer input 20 along with the response 310, and any other data from the training model 300 corresponding to the response 310 (i.e., one or more intents 305), as the training data 220.

Continuing with the above example, a second customer input 20 of the transcript 152 is "Oh no, I spilled my coffee" and the corresponding agent input 30 is "I'm sorry to hear that, I hope you are okay." Here, the bot module 160 is unable to find a response 310 of the logic model 300 that is similar to the second agent input 30. Accordingly, the bot module 160 discards the rest of the transcript 152 (i.e., does not include this input pair or any subsequent input pairs as training data 220).

The above examples are for illustrative purposes and are not intended to be limiting. The bot module 160 may receive any number of transcripts 152 including any number of customer inputs 20 and agent inputs 30 to dynamically generate training data 220.

Figure 4:
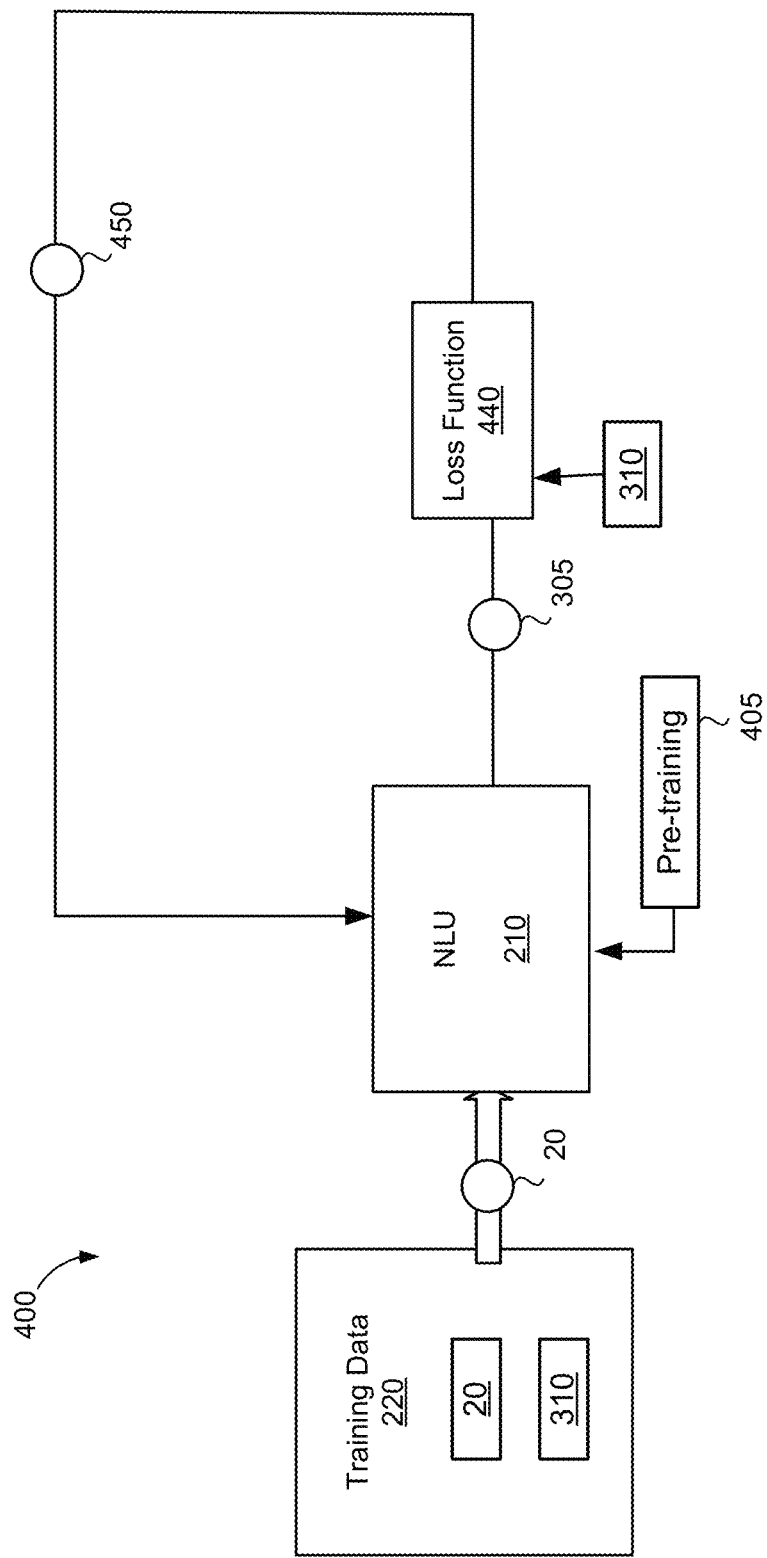
FIG. 4 is a schematic view of an example training process for a model

FIG. 2B is a schematic view 200B of an example bot module 160 dynamically building a logic model 300 for a chat bot. Here, the bot module 160 includes a natural-language understanding (NLU) model 210. The NLU model 210 may be trained using training data 220 generated using a logic model 300, as described herein (FIG. 2A and FIG. 4). The bot module 160 may provide a customer input 20 of a transcript 152 to the NLU model 210. In turn, the NLU model 210 outputs an intent 305 based on the customer input 20. The bot module 160 provides the intent 305 to a logic model 300. The bot module 160, in some examples, parses through the logic model 300 to determine a response 310 that corresponds to the intent 305. When the bot module 160 determines that no response 310 corresponds to the intent 305, the bot module 160 optionally decreases a metric 265 of the logic model 300. Alternatively, when the bot module 160 determines that a response 310 corresponds to the intent 305, the bot module 160 increases the metric 265. Here, the metric 265 corresponds to a rating or quality or comprehensiveness of the logic model 300. A higher metric 265 may indicate that the logic model 300 has broad coverage. Conversely, a low metric 265 may indicate that the logic model 300 has poor coverage or has insufficient coverage. Further, the metric 265, in some implementations, compares various logic models 300.

When the bot module 160 does select a response 310S that corresponds to the intent 305, the bot module 160 provides the response 310S to a comparison module 250, along with the agent input 30 that corresponds to the customer input 20 of the transcript 152. Optionally, the comparison module 250 generates a similarity score 253 based on the response 310S and the agent input 30. In some implementations, the comparison module 250 employs embedding techniques to generate the similarity score 253. The bot module 160 also compares the similarity score 253 of the response 310 to the similarity threshold 255. When the similarity score 253 of the response 310 satisfies the similarity threshold 255 (e.g., when the similarity score 253 is equal to or larger than the similarity threshold 255), the bot module 160 may increase the metric 265 of the logic model 300. Alternatively, when the similarity score 253 of the response 310 does not satisfy the similarity threshold 255 (e.g., when the similarity score 253 is smaller than the similarity threshold 255), the bot module 160 decreases the metric 265. In some examples, the bot module 160 adds a new response 310, 310X to the logic model 300. For example, the bot module 160 adds the agent input 30 as a new response 310X to the logic model 300, based on the corresponding intent 305.

In some implementations, the bot module 160 receives "golden" transcripts 152 when dynamically building a logic model 300 for a chat bot, as illustrated in FIG. 2B. Such golden transcripts 152 are pre-screened transcripts 152 (e.g., manually by a human) that represent conversations that the logic model 300 should ideally be able to replicate. In other words, the golden transcripts 152 are intended as ideal training examples to which the logic model 300 is expected to have a satisfactory response 310 for each customer input 20. In these implementations, the metric 265 is increased/decreased more harshly based on the success of the logic model 300. For example, when the bot module 160 cannot find a response 310 in the logic model 300 that is satisfactorily similar to an agent input 30 of the golden transcript 152, the bot module 160 may decrease the metric 265 by a greater factor than compared to a similar occurrence when using a regular (i.e., not "golden") transcript 152.

FIG. 3 is a schematic view of an example logic model 300. In some implementations, the logic model 300 is a logic tree, as illustrated. However, the illustration is not intended to be limiting and the logic model 300 can be in any appropriate form. The logic model 300 can include one or more nodes connected by one or more branches. The nodes may correspond to an intent 305 and/or a response 310. For example, an intent 305, 305a corresponds to billing. That is, this portion of the logic model 300 corresponds to responses 310 related to customer inputs 20 that are related to billing. Here, the intent 305a is connected to two child nodes representing more specific intents 305 related to billing intent 305a. For example, an intent 305, 305b corresponds to billing plans. The intent 305b is connected to two child nodes representing responses 310, 310a-b. Here, each of the response 310a (i.e., "Do you want to cancel your plan?") and the response 310b (i.e., "What plan do you want?") correspond to both intent 305a and intent 305b. For example, when an NLU model 210, in response to a transcript 152, outputs an intent 305a (i.e., billing), the bot module 160 selects either response 310a and/or 310b of logic model 300 as an appropriate response 310 to the customer input 20.

With continued reference to FIG. 3, an exemplary intent 305, 305c corresponds to discounts related to a billing intent 305a. Here, the intent 305c only has a single related response 310c (i.e., "We do not have any available discounts."). In some implementations, the bot module 160 is configured to add additional responses 310 to the logic model 300. As described above (FIG. 2B), when the logic model 300 does not include a response 310 that satisfies a similarity threshold 255, the bot module 160 adds one or more responses 310 to the logic model 300. For example, when a transcript 152 includes a customer input 20 saying "I would like discounts on my bill," the NLU model 210 determines intents 305a, 305c are related to billing and discounts based on the customer input 20. Here, the logic model 300 only includes one response 310c related to both intents 305a, 305c. When the response 310c is not sufficiently similar to an agent input 30 corresponding to the customer input 20 (i.e., a similarity score 253 determined based on the response 310c and the agent input 30 does not satisfy the similarity threshold 255), then the bot module 160 adds a new response 310X to the logic model. In this example, when the agent input 30 is "I will try to find a discount for you," the response 310c of "We do not have any available discounts" is not sufficiently similar. Thus, the bot module 160 adds the agent input 30 as the new response 310X (i.e., "I will try and find a discount for you" to the logic model 300 under the nodes related to the intents 305a, 305c (i.e., discounts and billing). In some implementations, the bot module alters a metric 265 corresponding to the performance of the logic model 300.

Referring now to FIG. 4, a training process 400 illustrates training a model 210 (i.e., the NLU model 210) using the training data 220 (generated, for example, by the bot module 160 of FIG. 1). Though a single model 210 is illustrated, the training process 400 may generate and/or train multiple models 210 of different types or with different parameters. For example, the model 210 is a differentiable learning model and includes any of a deep neural network, a recurrent neural network, a temporal convolutional network, a long short term memory network, etc. Further, the training process 400 may include using mini-batch stochastic gradient descent techniques for training the model 210.

In some implementations, the process 400 employs a two-step training technique that includes pre-training and training. Pre-training is a technique used for initializing a model 210 which can then be further fine-tuned based on additional training data 220. For the model 210, pre-training may include initiating the model 210 with pre-training data 405 including transcripts that have been previously labeled. In some implementations, a base or a generic NLU model 210 is configured in pre-training and then fine-tuned for a specific entity using training data 220 generated at the entity. For example, an entity may have thousands of transcripts (e.g., transcripts 152 of FIG. 1) of conversations between customers and agents of the entity. The transcripts may be labeled to be used as training data 220 as described above (FIG. 2A). Accordingly, the NLU model 210 trained on such training data 220 will be specifically tailored based on transcripts corresponding to the entity.

The process 400, in some examples, includes fine-tuning parameters of the pre-trained model 210. In these examples, the process 400 includes providing the training data 220 to the model 210. The training data 220 can include any data that can be used to train an NLU model 210 to interpret language inputs. For example, the training data 220 can include multiple transcripts of conversations. In some implementations, each sample of the training data 220 includes a customer input 20 and a response 310. Here, the response 310 acts as a label or a target output of the NLU model 210 based on the customer input 20. Each response 310 may correspond to (and/or include) one or more intents (e.g., the intents 305 of FIG. 3).

Upon receiving the training data 220, the model 210, in some implementations, generates an output 305 (e.g., the intent 305). The intent 305 may be represented as a vector, an embedding, a probability distribution, or any other appropriate representation. In some implementations, the output 305 is used by a loss function 440 to generate a loss 450. That is, the loss function 440 compares the output 305 and the response 310 to generate the loss 450, where the loss 450 indicates a discrepancy between the response 310 (i.e., the target output) and the output 305. The loss function 440 may implement any suitable technique to determine a loss such as regression loss, mean squared error, mean squared logarithmic error, mean absolute error, binary classification, binary cross entropy, hinge loss, multi-class loss, etc. In some examples, the loss 450 is provided directly to the model 210. In these examples, the model 210 processes the loss 450 and adjusts one or more parameters of the model 210 (e.g., weights) to account for the loss 450. In some implementations, the model 210 is continually trained (or retrained) as additional training data 220 is received.

Once the NLU model 210 is sufficiently trained, the NLU model 210 may be implemented to dynamically build a chatbot. In other words, the NLU model 210 may be implemented in a process to automatically generate a logic model 300, as discussed above (FIG. 2B).

Figure 5:
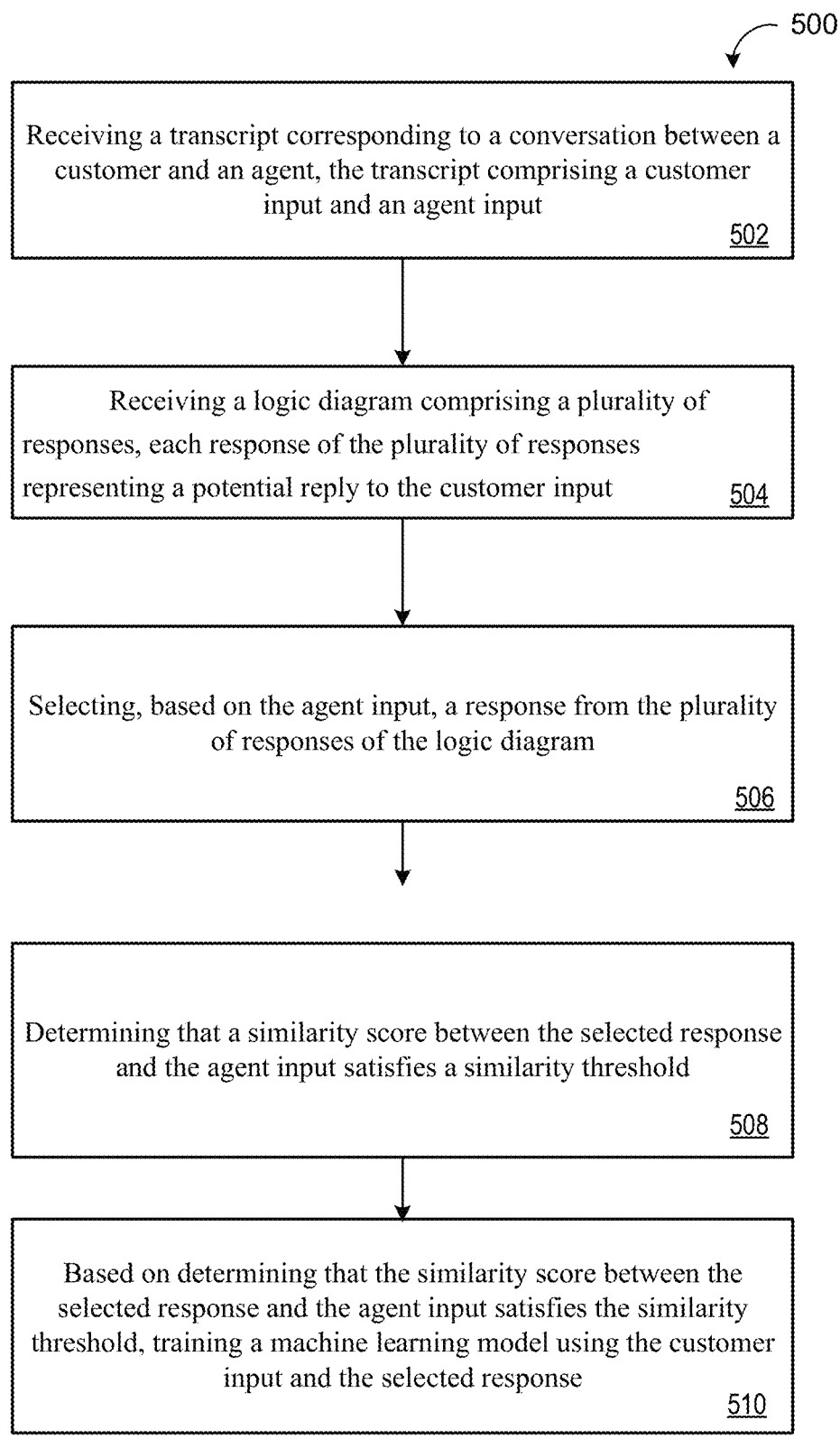
FIG. 5 is a flowchart of an example arrangement of operations for a method of dynamically generating training data for a model.

FIG. 5 is a flowchart of an exemplary arrangement of operations for a method 500 of dynamically generating training data for a model. The method 500 may be performed, for example, by various elements of the dynamic bot building system 100 of FIG. 1 and/or the computing device 600 of FIG. 6. At operation 502, the method 500 includes receiving a transcript 152 corresponding to a conversation between a customer 12 and an agent 11, the transcript 152 including a customer input 20 and an agent input 30. At operation 504, the method 500 includes receiving a logic model 300 including a plurality of responses 310, each response 310 of the plurality of responses 310 a potential reply to the customer input 20. At operation 506, the method 500 further includes selecting, based on the agent input 30, a response 310 from the plurality of responses 310 of the logic model 300. At operation 508, the method 500 includes determining that a similarity score 253 between the selected response 310 and the agent input 30 satisfies a similarity threshold 255. At operation 510, the method 500 includes, based on determining that the similarity score 253 between the selected response 310 and the agent input 30 satisfies the similarity threshold 255, training a machine learning model 210 using the customer input 20 and the selected response 310.

Figure 6:
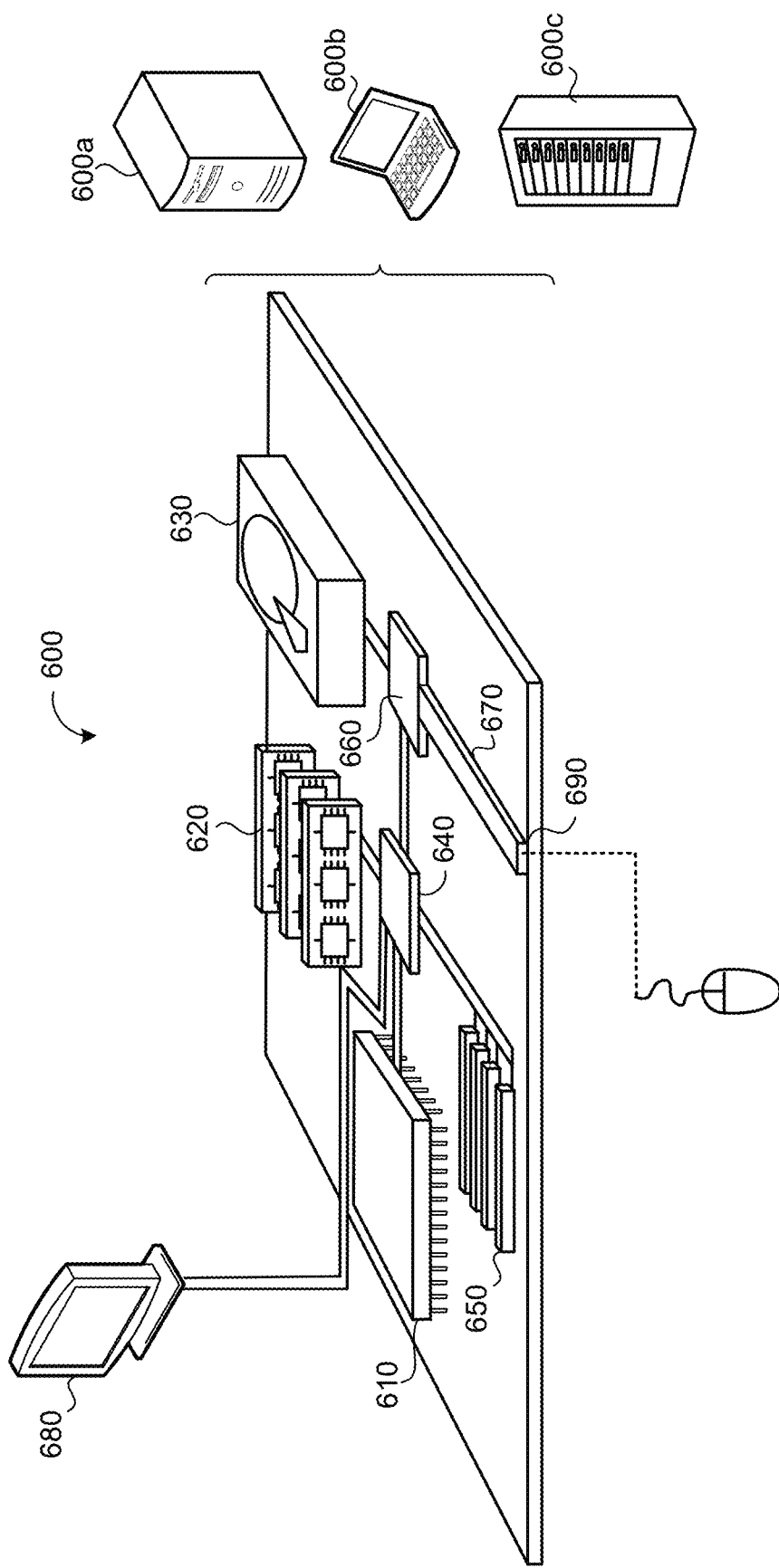
FIG. 6 is a schematic view of an example computing device that may be used to implement the systems and methods described herein.

FIG. 6 is a schematic view of an example computing device 600 that may be used to implement the systems and methods described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 600 includes a processor 610, memory 620, a storage device 630, a high-speed interface/controller 640 connecting to the memory 620 and high-speed expansion ports 650, and a low speed interface/controller 660 connecting to a low speed bus 670 and a storage device 630. Each of the components 610, 620, 630, 640, 650, and 660, are interconnected using various busses, and may be mounted on a common motherboard or in other manners as appropriate. The processor 610 can process instructions for execution within the computing device 600, including instructions stored in the memory 620 or on the storage device 630 to display graphical information for a graphical user interface (GUI) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and a low-speed expansion port 690. The low-speed expansion port 690, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 600a or multiple times in a group of such servers 600a, as a laptop computer 600b, or as part of a rack server system 600c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method executed by data processing hardware that causes the data processing hardware to perform operations comprising:
   receiving a transcript corresponding to a conversation between a customer and an agent, the transcript comprising a customer input and an agent input;
   receiving a logic model comprising a plurality of responses, each response of the plurality of responses representing a potential reply to the customer input;
   selecting, based on the agent input, a response from the plurality of responses of the logic model;
   determining that a similarity score between the selected response and the agent input satisfies a similarity threshold; and
   based on determining that the similarity score between the selected response and the agent input satisfies the similarity threshold, training a machine learning model using the customer input and the selected response.

2. The method of claim 1, wherein the machine learning model is a natural language understanding (NLU) model.

3. The method of claim 1, wherein determining that the similarity score between the selected response and the agent input satisfies the similarity threshold comprises using an embedding to compare the selected response to the agent input.

4. The method of claim 1, wherein the logic model comprises a logic tree.

5. The method of claim 1, wherein:
   the transcript comprises a first transcript; and
   the operations further comprise:
      receiving a second transcript corresponding to a second conversation between the customer and the agent, the second transcript comprising a second customer input and a second agent input;
      selecting, based on the second agent input, a second response from the plurality of responses of the logic model;
      determining that a second similarity score between the selected second response and the second agent input fails to satisfy the similarity threshold; and
      based on determining that the similarity score between the selected second response and the second agent input fails to satisfy the similarity threshold, discarding the second transcript.

6. The method of claim 1, wherein selecting, based on the agent input, the response from the plurality of responses of the logic model comprises iterating through the plurality of responses to find the response that most closely matches the agent input.

7. The method of claim 1, wherein:
   the customer input comprises a first customer input;
   the agent input comprises a first agent input;
   the transcript comprises a second customer input and a second agent input; and
   the operations further comprise:
      selecting, based on the second agent input, a second response from the plurality of responses of the logic model;
      determining that a second similarity score between the selected second response and the second agent input fails to satisfy the similarity threshold; and
      based on determining that the second similarity score between the selected second response and the second agent input fails to satisfy the similarity threshold, adding a new response to the plurality of responses based on the second agent input.

8. The method of claim 7, wherein the logic model comprises a metric indicating a coverage of the logic model.

9. The method of claim 8, wherein the operations further comprise, based on determining that the second similarity score between the selected second response and the second agent input does not satisfy the similarity threshold, reducing the metric.

10. The method of claim 1, wherein the transcript comprises a pre-screened transcript.

11. A system comprising:
    data processing hardware; and
    memory hardware in communication with the data processing hardware, the memory hardware storing instructions that when executed on the data processing hardware cause the data processing hardware to perform operations comprising:
       receiving a transcript corresponding to a conversation between a customer and an agent, the transcript comprising a customer input and an agent input;
       receiving a logic model comprising a plurality of responses, each response of the plurality of responses representing a potential reply to the customer input;
       selecting, based on the agent input, a response from the plurality of responses of the logic model;
       determining that a similarity score between the selected response and the agent input satisfies a similarity threshold; and
       based on determining that the similarity score between the selected response and the agent input satisfies the similarity threshold, training a machine learning model using the customer input and the selected response.

12. The system of claim 11, wherein the machine learning model is a natural language understanding (NLU) model.

13. The system of claim 11, wherein determining that the similarity score between the selected response and the agent input satisfies the similarity threshold comprises using an embedding to compare the selected response to the agent input.

14. The system of claim 11, wherein the logic model comprises a logic tree.

15. The system of claim 11, wherein:
    the transcript comprises a first transcript; and
    the operations further comprise:
       receiving a second transcript corresponding to a second conversation between the customer and the agent, the second transcript comprising a second customer input and a second agent input;
       selecting, based on the second agent input, a second response from the plurality of responses of the logic model;
       determining that a second similarity score between the selected second response and the second agent input fails to satisfy the similarity threshold; and
       based on determining that the similarity score between the selected second response and the second agent input fails to satisfy the similarity threshold, discarding the second transcript.

16. The system of claim 11, wherein selecting, based on the agent input, the response from the plurality of responses of the logic model comprises iterating through the plurality of responses to find the response that most closely matches the agent input.

17. The system of claim 11, wherein:
the customer input comprises a first customer input;
the agent input comprises a first agent input;
the transcript comprises a second customer input and a second agent input; and
the operations further comprise:
- selecting, based on the second agent input, a second response from the plurality of responses of the logic model;
- determining that a second similarity score between the selected second response and the second agent input fails to satisfy the similarity threshold; and
- based on determining that the second similarity score between the selected second response and the second agent input fails to satisfy the similarity threshold, adding a new response to the plurality of responses based on the second agent input.

18. The system of claim 17, wherein the logic model comprises a metric indicating a coverage of the logic model.

19. The system of claim 18, wherein the operations further comprise, based on determining that the second similarity score between the selected second response and the second agent input does not satisfy the similarity threshold, reducing the metric.

20. The system of claim 11, where the transcript comprises a pre-screened transcript.

* * * * *